United States Patent
Terlizzi et al.

(10) Patent No.: US 9,418,032 B2
(45) Date of Patent: Aug. 16, 2016

(54) ADAPTIVE ACCESSORY DETECTION AND MODE NEGOTIATION

(71) Applicant: Apple Inc., Cupertino, CA (US)

(72) Inventors: Jeffrey J. Terlizzi, San Francisco, CA (US); Jesse L. Dorogusker, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/058,291

(22) Filed: Oct. 21, 2013

(65) Prior Publication Data

US 2014/0156884 A1    Jun. 5, 2014

Related U.S. Application Data

(63) Continuation of application No. 12/725,329, filed on Mar. 16, 2010, now abandoned.

(60) Provisional application No. 61/160,582, filed on Mar. 16, 2009.

(51) Int. Cl.
| | |
|---|---|
| *G06F 3/00* | (2006.01) |
| *G06F 13/38* | (2006.01) |
| *G06F 13/42* | (2006.01) |

(52) U.S. Cl.
CPC ............ *G06F 13/385* (2013.01); *G06F 13/426* (2013.01)

(58) Field of Classification Search
None
See application file for complete search history.

(56) References Cited

U.S. PATENT DOCUMENTS

| 6,774,604 | B2 * | 8/2004 | Matsuda | G06F 1/263 320/110 |
|---|---|---|---|---|
| 7,364,436 | B2 | 4/2008 | Yen | |
| 7,480,758 | B2 | 1/2009 | Lin et al. | |
| 7,635,280 | B1 | 12/2009 | Crumlin et al. | |
| 7,880,475 | B2 | 2/2011 | Crumlin et al. | |
| 2006/0053238 | A1 | 3/2006 | Hung et al. | |
| 2010/0070659 | A1 | 3/2010 | Ma et al. | |

OTHER PUBLICATIONS

Pinouts.Ru; "Apple iPod and iPhone Dock Interfaces Pinout,"; Aug. 16, 2008; 4 pages.
Non-Final Office Action mailed on Aug. 25, 2011 for U.S. Appl. No. 12/725,329, 14 pages.
Final Office Action mailed on Feb. 23, 2012 for U.S. Appl. No. 12/725,329; 15 pages.
Non-Final Office Action mailed on Sep. 11, 2012 for U.S. Appl. No. 12/725,329, 15 pages.
Non-Final Office Action mailed on Feb. 13, 2013 for U.S. Appl. No. 12/275,329, 14 pages.
Final Office Action mailed on Jun. 20, 2013 for U.S. Appl. No. 12/725,329; 15 pages.

* cited by examiner

*Primary Examiner* — Idriss N Alrobaye
*Assistant Examiner* — Richard B Franklin
(74) *Attorney, Agent, or Firm* — Kilpatrick Townsend & Stockton LLP

(57) ABSTRACT

Methods and apparatus for providing device detection and operational mode negotiation entirely over extant high-speed data bus pins or terminals. In one exemplary embodiment, methods and apparatus are disclosed enabling detection, negotiation and serial/video data transfer over USB 2.0 data interface pins in order to consolidate pin count on the interface and associated connector. Existing USB detection mechanisms are also leveraged to the maximum extent so as to eliminate the need for additional detection protocols. This approach allows for smaller connector and parent device form factor, while still maintaining all of the functional capabilities required for that interface. The breadth of USB-capable devices supported by such an interface is also markedly improved over prior art techniques.

15 Claims, 7 Drawing Sheets

|          | DP | DN | VBUS | ACC_DET* | ACC_ID |
|----------|----|----|------|----------|--------|
| USB Brick | 1  | 1  | 1    | 1        | X      |
| FS_D     | 1  | 0  | X    | 0        | X      |
| LS_D     | 0  | 1  | X    | 0        | X      |
| Host     | 0  | 0  | 1    | X        | 191 kΩ |

X: Don't Care

FIG. 7

ADAPTIVE ACCESSORY DETECTION AND MODE NEGOTIATION

CROSS-REFERENCES TO RELATED APPLICATIONS

This application is a continuation of U.S. patent application Ser. No. 12/725,329, filed Mar. 16, 2010, and claims priority to U.S. provisional patent application No. 61/160,582, filed Mar. 16, 2009, which are incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of Invention

This relates generally to the field of portable consumer electronics devices and peripherals thereof, and in one exemplary enables a user device such as a portable media player to dynamically adapt to a wide variety of accessory devices.

2. Description of Related Technology

Portable media players (such as the Apple iPod™ family of devices and other so-called "MP3 players"), cellular telephones/smart phones (such as the Apple iPhone™), handheld computers, and personal digital assistants (PDA) allow users to store and playback audio and video files. Such devices have become extraordinarily popular, and their use has greatly enhanced the quality of life for many people. However, as the use of such equipment has increased, so has the need to connect equipment of differing types and functions purchased from different manufacturers. For example, an iPhone and a digital camera may each be useful when used alone; however, the ability to connect the digital camera to the iPhone and exchange information (e.g., photos, video) between the two makes the combination even more useful and flexible.

Connection of USB Devices to Connectors

FIG. 2 illustrates a typical prior art user device configuration, wherein a user device such as a portable media player or smartphone 200 is connected via a multi-pin connector to a USB Type A connector receptacle 202 (e.g., Camera Connector "dongle"). A USB-enabled camera 204 is then connected to the receptacle via an interface cable 206 between the devices. The illustrated receptacle 202 comprises for instance a microcontroller unit (MCU; not shown), a serial interface, FireWire (IEEE Std. 1394a-c) interface, plus device authentication capability, and provides a USB pass-through capability to the USB cable, as well as a 5V DC/DC step-up PSU. The illustrated receptacle device 202 authenticates the connected media player or smartphone 200 over the serial pins, and a signal sent over the serial pins tells the user device 200 to enter a USB host mode, with USB signal "pass through" to/from the peripheral for transferring data over the interface.

In this instance, the media player, smartphone or other device operates as a USB host at all times, based on an active signal from the receptacle 202. The MCU does not communicate with the user device 200 over the USB interface. Rather, only traditional USB-based speed detection and identification mechanisms (i.e., those of FIG. 1 based on D+ and D− pins) are employed within the receptacle 202 when the USB camera 204 is plugged into the receptacle 202. The receptacle power "booster" is used to boost the 3.3V output of the user device 200 to 5V, thereby signaling the connected camera 204 that the device to which it is connected is acting as a USB host, in response to which the camera 204 configures it D+/D− USB signals accordingly.

Separate hardware or other apparatus are required to permit interfacing of USB-based devices. For instance, in the extant "host mode" configuration of FIG. 2, a separate receptacle 202 (e.g., the Apple iPod Camera Connector dongle) having significant intelligence and complexity is required in order to permit the slave device (USB camera) to transfer media to the host media device or smartphone. This is less than optimal, in that it requires the user to possess such a complex dongle 202, which is generally only suited to interfacing a single type of device (here, a USB camera).

Also, under the scheme shown in FIG. 2, digital audio output from the media player or smartphone is precluded, in that digital audio cannot be output without the peripheral acting as a USB host. Accordingly, the connection of digital audio-consuming peripheral or accessory devices such as speakers is frustrated using the "dongle" approach of FIG. 2, since the media player or smartphone always acts as the USB host in such configurations. Moreover, even when using other approaches that may not automatically place the user device into USB "host" mode, the peripheral device must necessarily be able to act as a host, thereby requiring a greater degree of complexity and cost in the accessory. There is currently a significant market for lower-end (i.e., simpler and lower cost) digital audio accessories; this market cannot be fully realized or leveraged by the prior art solutions described above.

Therefore, improved methods and apparatus are needed to support maintaining all of the desired functionality of the electrical and signal interface(s) supported therein, and providing the ability to selectively negotiate operation according to various modes of functionality and or connectivity. Enhanced detection schemes are needed to differentiate between connectors supporting newer functionality, and connectors which retain legacy characteristics. Ideally, such detection schemes would enable present and future feature support and expansion capability, while retaining backward compatibility. For example, devices which were previously limited to peripheral or "slave" device operation would be newly suitable for operation as a "host" device under appropriate conditions, and intelligent selection between the two would be enabled as well. Lastly, such improved methods and apparatus should support a broad population of accessory devices.

SUMMARY

The present invention satisfies the aforementioned needs by providing, inter alia, improved apparatus and methods for enabling a portable media player to dynamically adapt to a wide variety of accessory devices, and/or provide host functionality.

In a first aspect of the invention, a method of operating a peripheral interface of a media-capable device is disclosed. In one embodiment, the method comprises: after connection of an accessory to a connector of the peripheral interface, detecting the presence of a power signal on a power conductor of the connector, the power conductor being associated with a USB data interface; determining the values of first and second signals on respective first and second conductors of the connector, the first and second conductors being associated with the USB data interface; and based on at least the determining, classifying the accessory as either (i) a power supply accessory, or (ii) a USB host device.

In one variant, the connector comprises a multi-pin connector having serial, video, and a high speed serialized bus protocol conductors in addition to the power conductor and first and second conductors.

In another variant, determining the values of signals on first and second conductors associated with the USB data interface comprises evaluating for both SE0 and SE1 conditions on the D+/D− conductors of the USB interface. Classifying the accessory as either (i) a power supply accessory, or (ii) a USB host device, comprises for example classifying the accessory as a USB host device when neither the SE0 or SE1 conditions are detected.

In another embodiment, the method comprises: after connection of an accessory to a connector of the peripheral interface, detecting the absence of a power signal on a power conductor of the connector, the power conductor being associated with a USB data interface; determining the value of a signal on a conductor of the connector, the conductor being used for detecting the presence of the accessory; determining the values of first and second signals on respective first and second data conductors of the connector, the first and second conductors being associated with the USB data interface; and based on the acts of determining, operating the media-capable device as a USB host device.

In yet another embodiment, the method comprises: detecting connection of the first peripheral device via a connector; sampling a power pin of the connector, the power pin adapted to indicate a first mode, or a plurality of second modes, the plurality of second modes comprising at least a host mode and one or more special modes; and if the power pin indicates the first mode, adapting the peripheral interface to perform slave functionalities for a first protocol; or if, the power pin indicates the plurality of second modes, sampling an identifier pin of the connector, the identifier pin adapted to indicate at least one of the plurality of second modes.

In one variant, the first mode comprises a host mode, and the method further comprises: if the identifier pin indicates the host mode, adapting the peripheral interface to perform host functionalities of the first protocol; or if the identifier pin indicates the one or more special modes, adapting the peripheral interface to conform to the one or more special modes.

n another variant, the connector comprises a multi-function connection having at least a high speed serialized bus protocol interface, and the power pin is associated with the serialized bus protocol interface. The high speed serialized bus protocol interface comprises a universal serial bus (USB) interface.

In yet a further variant, the detecting connection of the first peripheral device via a connector comprises detecting connection via a detection pin of the connector.

In a second aspect of the invention, a portable user device is disclosed. In one embodiment, the device comprises: a processor; a storage device configured for storage of media data; and a signal interface in data communication with the processor. The interface includes: a multi-terminal connector having a plurality of terminals including a device detection terminal; a high speed serialized protocol interface in signal communication with the connector; and logic in communication with at least portions of the plurality of terminals and operative to perform device detection using at least the device detection terminal. The signal interface is configured to, responsive to at least the device detection, operate according to a host mode.

In one variant, the high speed serialized protocol interface comprises a USB 2.0 interface, and the host mode comprises USB 2.0 Host Mode. The signal interface is further configured to operate according to a host mode based at least in part on voltages present on respective ones of USB data pins associated with the USB 2.0 interface.

In a third aspect of the invention, apparatus for use in interfacing an electronic device to an accessory over a high-speed serialized protocol bus interface is disclosed. In one embodiment, the apparatus comprises: a connector having (i) a detection pin, and (ii) a plurality of other pins associated with the high-speed serialized protocol bus interface; and logic in operative communication with the detection pin and the plurality of other pins. The logic is adapted to: detect the presence of the accessory using at least the detection pin; detect the presence or absence of electrical power over at least one of the plurality of other pins of the bus interface; detect the configuration of the accessory using others of the plurality of other pins of the bus interface; and determine, based on the detection of presence of the accessory, presence or absence of electrical power, and configuration of the accessory, whether or not the electronic device should operate in a host mode when connected to the accessory.

In one variant, the electronic device comprises a media-capable device, and the high-speed serialized protocol comprises a Universal Serial bus (USB) protocol.

In another variant, the apparatus further comprises a second high-speed serialized protocol (e.g., a FireWire (IEEE Std. 1394) protocol), and the connector comprises a 30-pin connector.

In yet another variant, the at least one of the plurality of other pins of the bus interface over which the presence or absence of electrical power is detected comprises a power pin of the bus interface; and the others of the plurality of other pins of the bus interface over which the accessory configuration is detected comprises two (2) data pins of the bus interface.

In another aspect of the invention, a computer readable apparatus is disclosed which includes a storage media having a computer program with a plurality of instructions, the instructions adapted to, when executed on a processor, implement accessory detection and host/peripheral negotiation logic.

In another aspect of the invention, an interface for use in e.g., a media device or smartphone is disclosed. In one embodiment, the interface is rendered at least partly in hardware or firmware, and includes one or more integrated circuits (ICs) which implement accessory detection and host/peripheral negotiation logic.

In yet another aspect of the invention, a reduced form-factor multi-interface connector is disclosed. In one embodiment, the connector comprises a USB-based or other high-speed data interface, and utilizes this interface for device detection and host/peripheral mode negotiation as well as data transfer (and power supply/receipt).

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 7 illustrates a truth table corresponding with the flow chart diagram of FIG. 6.

DESCRIPTION OF ILLUSTRATIVE EMBODIMENTS

Figure 1:
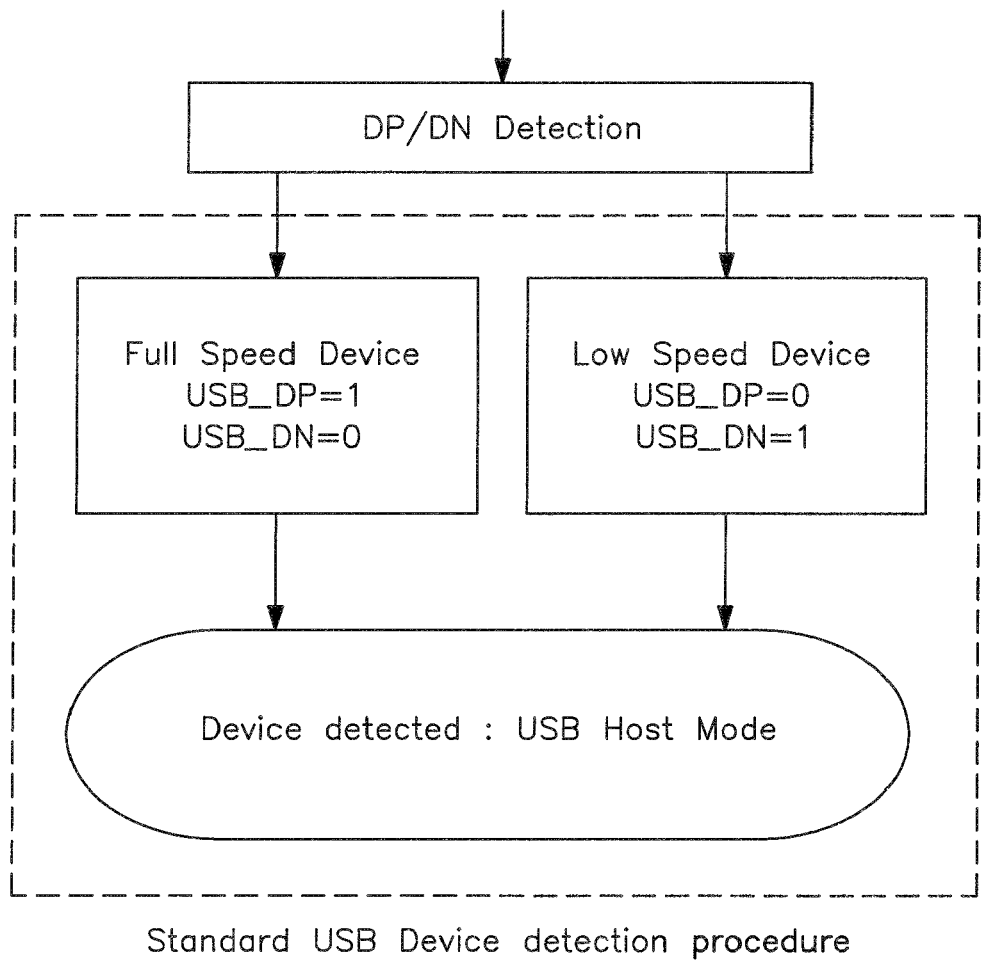
FIG. 1 is graphical illustration of a prior art USB 2.0 detection and identification scheme.

Reference is now made to the drawings, wherein like numerals refer to like parts throughout.

Overview

In one aspect, the present invention provides methods and apparatus for providing device detection and operational mode negotiation over extant high-speed data bus pins or terminals, thereby obviating the need for additional pins or terminals within a connector form factor (whether a legacy form factor, or a new one) while still maintaining all of the functional capabilities required for that interface. In one exemplary embodiment, methods and apparatus are disclosed enabling detection, authentication, negotiation and serial/video data transfer over USB 2.0 data interface pins (and one or two other indigenous pins) in order to consolidate pin count.

Existing USB detection mechanisms are also leveraged to the maximum extent so as to eliminate the need for additional detection protocols.

Moreover, by allowing the user device to negotiate USB "host" or "peripheral" modes, the connected device and accessory can more gracefully adopt their appropriate host or peripheral role in a given device topology.

The need for a "smart" adapter or dongle is also obviated in certain embodiments of the invention. For instance, a "dumb" dongle (i.e., one that does not require the capabilities of the existing specialized approaches such as that shown in FIG. 2 herein) can be used effectively as a universal passthrough between the proprietary (e.g., 30-pin or less) connector and the USB 2.0 form factor connector on the peripheral or its cable, thereby leveraging the broad base of USB connector-equipped devices now in the market.

The improved detection techniques and apparatus disclosed herein also provide the opportunity for host mode negotiation between two connected devices, thereby allowing for at least some of the functions associated with operating the interface to be offloaded to the user device host (e.g., media player or smartphone). This approach advantageously permits increased simplification of the peripheral devices. For instance, clock recovery within the peripheral can be enabled by the host's clock signal, thereby eliminating the need for the peripheral to have its own crystal oscillator (and associated cost).

In another embodiment, digital audio data can be streamed out over the USB data interface between the accessory and the media player or smartphone (acting as a USB host), thereby allowing for simplified "low end" audio devices to access digital audio streams conveniently and without the need for USB "host" capabilities.

Similarly, in another embodiment, digital video can be streamed out of the "host" user device media player or smartphone to a "low end" video player or other such peripheral over the USB interface, again avoiding the cost and complexity of placing host functionality within the peripheral.

The improved apparatus and methods described herein also enable support of both powered and unpowered legacy devices, and future device configurations.

In another variant of the invention, a USB 3.0 interface is supported, including functions relating to the "Superspeed" and full-duplex data capabilities thereof. Such capabilities can be leveraged for example in the delivery of high-bandwidth video (e.g., HD video), or for high-speed accesses to a mass storage device of a user device (e.g., HDD of a laptop or media device) via a connected accessory.

DETAILED DESCRIPTION OF EXEMPLARY EMBODIMENTS

Exemplary embodiments of the present invention are now described in detail. While these embodiments are primarily discussed in the context of a portable media player and its accessory connector, it will be recognized by those of ordinary skill that the present invention is not so limited. In fact, the various aspects of the invention are useful in any electronics device requiring supporting multiple feature sets via the same physical connector, as is disclosed herein. Such devices may include without limitation cellular phones or smartphones, laptop or desktop computers, PDAs, handheld computers, etc.

Moreover, while the exemplary embodiment described below are cast in terms of Universal Serial Bus (USB) interfaces, it will be appreciated that the invention is not limited to such interfaces, and in fact may be readily adapted for other interfaces such as (and without limitation) FireWire/1394.

USB

USB is a nearly ubiquitous serial bus standard enabling peripheral devices to communicate with a "host" device. USB signaling is performed on pairs of high-speed differential lines providing data (however, the clock must be recovered). Standard USB may be implemented with as few as 4 (four) pins (i.e. VBUS, GND, D$^+$D$^-$), although other variants exist (e.g. USB On-The-Go (OTG), etc.). USB was originally intended to replace legacy serial and parallel ports in the computing arts. However, the low cost, simple and compact interface, and high speed data rate has made USB a de facto connectivity solution for a plethora of devices.

USB 2.0 (and its predecessors) specifies three (3) logical entity types: hosts, hubs and peripherals. The host controls one or more hubs or peripherals in a star topology. USB hubs enable branching structures or tiers. Accordingly, USB system topologies are a tiered star topology. USB device communication is based on "pipes", which are logical unidirectional channels into or out of an "endpoint" (i.e. host, or peripheral).

USB 2.0 device enumeration (i.e. detection and identification) is initiated when a peripheral device is connected to a host; see FIG. 1. A reset signal is sent to the peripheral device by the host. The speed of the peripheral device is determined by the reset states for its D$^+$ and D$^-$ lines. The host adjusts its speed accordingly, and proceeds to assign an address, and determine the peripheral configuration, etc.

Exemplary User Device Apparatus

Figure 3:
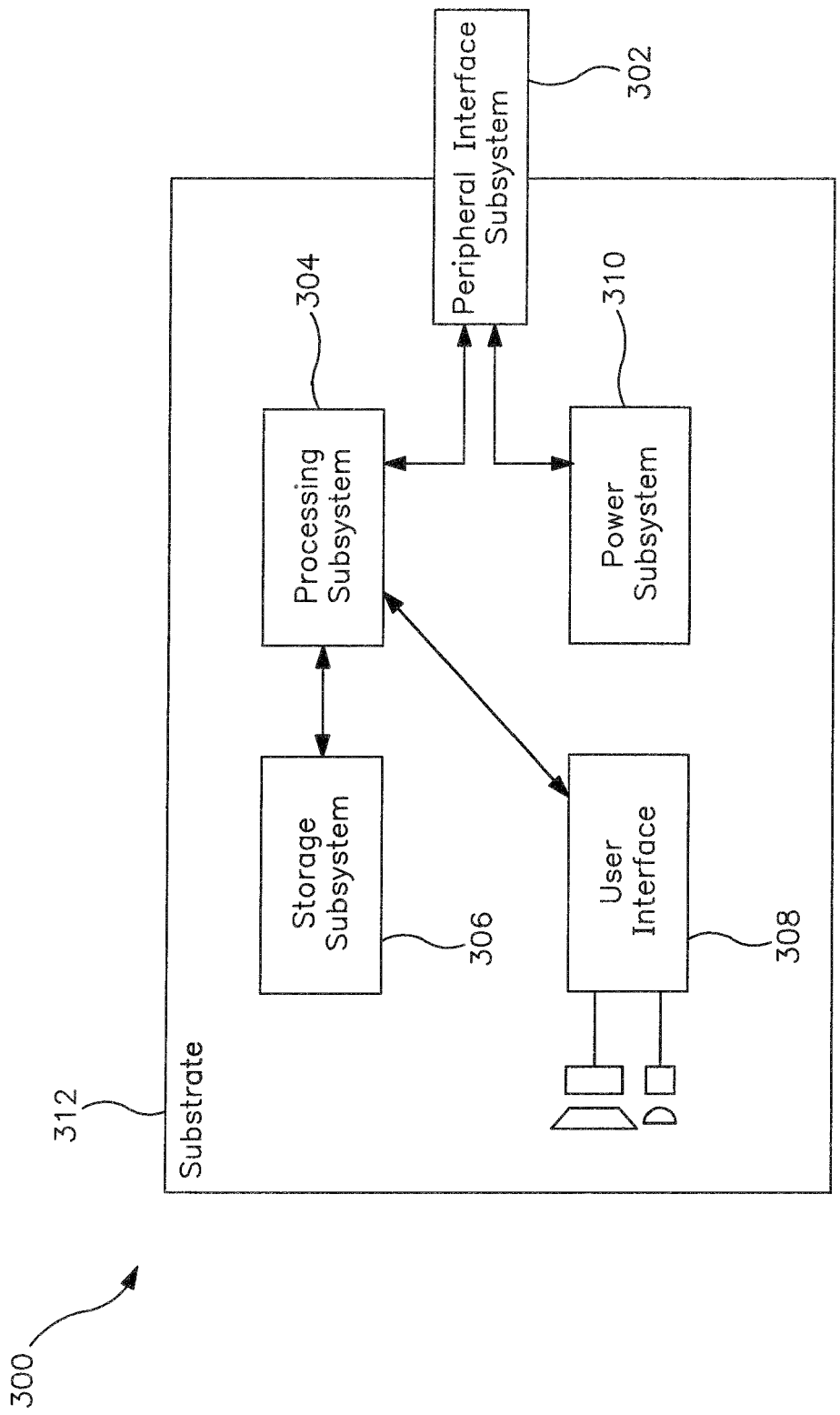
FIG. 3 is a block diagram illustrating one embodiment of a user device having a signal interface configured in accordance with the present invention.

FIG. 3 illustrates an exemplary user apparatus 300 useful in implementing the various aspects of the present invention. The exemplary apparatus 200 comprises in one embodiment a portable apparatus of the type described previously herein.

As used herein, the term "portable apparatus" includes without limitation personal media devices such as the aforementioned iPod™, as well as cellular telephones, smartphones (such as for example an iPhone™), personal computers (PCs), such as for example a wireless-enabled iMac™, Mac Pro™, Mac Mini™ or MacBook™, and minicomputers, whether desktop, laptop, or otherwise, as well as mobile devices such as handheld computers, PDAs, video cameras, set-top boxes, or any combinations of the foregoing.

In the illustrated embodiment, the apparatus 300 includes a peripheral interface subsystem 302, a processing subsystem 304, a storage subsystem 306, a user interface 308, and a power subsystem 310 mounted on one or more substrates 312 within the device.

The embodiment of the apparatus 300 of FIG. 3 is based primarily on integrated circuit (IC) in combination with board level (discrete) electronic components such as resistors, capacitors, inductors, choke coils, etc., although it will be appreciated that other approaches may be employed. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, system-on-chip or "SoC" devices, FPGAs, ASICs, ADCs, DACs, transceivers, memory controllers, and other devices, as well as any combinations thereof.

The peripheral interface subsystem 302 may include one or more connector ports, and associated components. Such components may include line drivers, FIFO buffers, dedicated microcontrollers, UARTS, memory elements, etc.

A USB 2.0-compliant signal interface is also provided as part of the peripheral interface subsystem 302. As used herein, the term "USB" refers without limitation to devices, processes or media compliant with the USB 1.0, USB 2.0, USB 3.0, and/or "USB OTG" standards.

The processing subsystem 304 of the device 300 may include a digital signal processor (DSP), microprocessor (e.g., CISC processor), RISC processor, field-programmable gate array, ASIC, array processor, RCF (reconfigurable compute fabric), and/or plurality of related or stand-alone processing components. The processing subsystem enables execution of a software application or other computer program, comprising a set of computer readable instructions. As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Moreover, while the exemplary apparatus refers to a software application, it is appreciated that in other implementations, the various features of the apparatus 300 may be performed in firmware, or alternately, codified directly in hardware (e.g. logical gates, sequential memories, etc.). The processing subsystem is operatively coupled to a memory subsystem 306.

The storage subsystem 306 includes one or more memory components, or disk drive (e.g., HDD, optical disk, etc.) or other mass storage components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem 306 may also implement one or a more of DMA type hardware, so as to facilitate data accesses as is well known in the processor arts. The memory subsystem stores the aforementioned computer readable instructions of the program(s). The memory subsystem may also retain transitive data useful for intermediate processing operations of the processing subsystem 304 (e.g., a software stack, etc.).

In one embodiment, the memory subsystem additionally comprises one or more memory components specifically adapted to playback audio or visual media. Such a memory subsystem preferably comprises one or more additional non-volatile memories (e.g. FLASH, HDD, etc.). In some embodiments, the memory subsystem may be directly communicative with one or more external media encoding and/or decoding devices (including also potentially transcoders and transraters) for processing AAC, RIFF, MP3, WAV files.

The user interface 308 of the apparatus is used to input and/or output data, information, commands, etc. to or from the user as applicable. It will be recognized that the term "user interface" as used herein may refer to, without limitation, any visual, graphical, tactile, audible, sensory, or other means of providing information to and/or receiving information from a user or other entity. For instance, the UI might comprise a touch-screen device capable of both display and receipt of input. Alternatively, the UI might include a display (e.g., TFT, LCD, plasma, CRT, etc.) and a separate input device such as keyboard and/or mouse, joystick, thumbwheel, trackball, toggle input light pen, etc.). Myriad different combinations and configurations of UIs are well known to those of ordinary skill in the computer arts, and accordingly not described further herein.

The illustrated power management subsystem (PMS) 310 provides power to the portable media player device 300, and may comprise an integrated circuit (IC) and/or a plurality of discrete electrical components as previously noted. In the exemplary portable media player apparatus, the power management subsystem interfaces with a battery. Furthermore, in some embodiments, the power management subsystem may receive external power via the peripheral interface subsystem 302 (e.g. 30-pin or other connector), and provide power conditioning capabilities (e.g. surge protection, brownout, blackout, etc.) as well as voltage step-up or step-down if required. Such power management commonly used in conjunction with the peripheral interface subsystem 302 includes wall adapters (i.e., 115 VAC), 12V car adapters, etc.

Exemplary Accessory Apparatus

Figure 4:
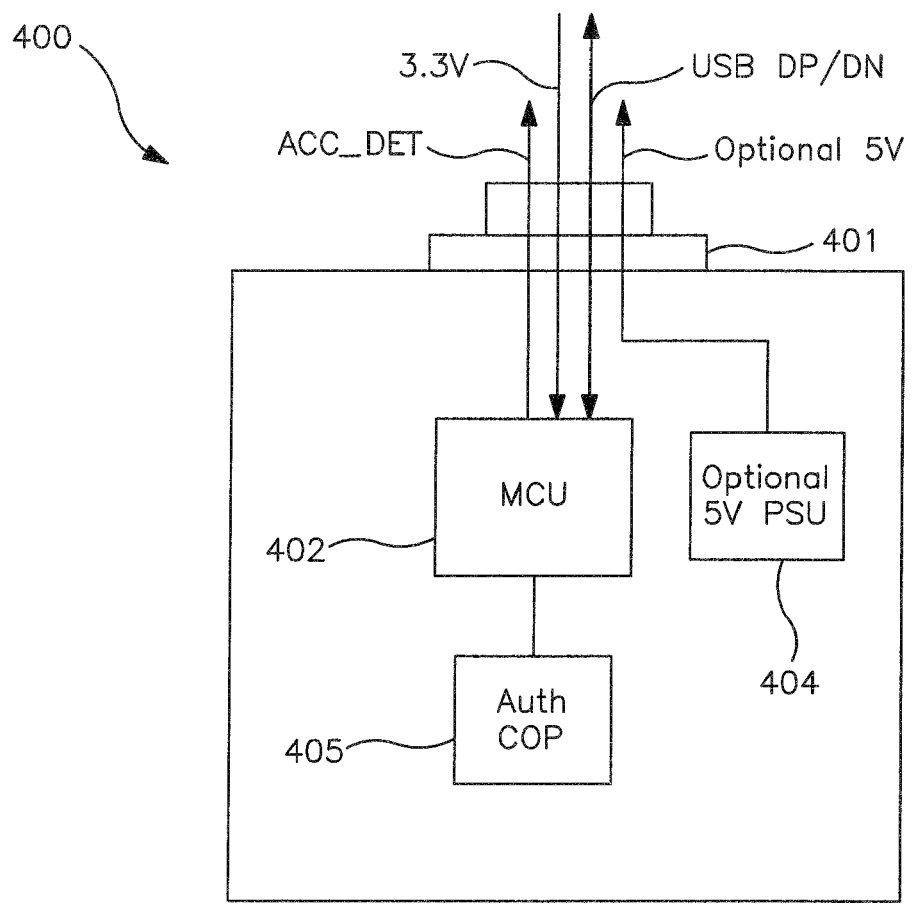
FIG. 4 is a block diagram illustrating one exemplary implementation of a USB 2.0 capable accessory device useful with the apparatus of FIG. 3.

FIG. 4 illustrates one exemplary implementation of a USB 2.0 capable accessory device 400, based on a multi-pin connector 401. The device 400 includes a digital processor or microcontroller unit (MCU) 402, an optional 5V step-up power supply 404 (needed to step a 3.3V board voltage to the 5V necessary for supply of VBUS in the case the accessory device 400 is "powered"), and an authentication coprocessor engine 405 (which may be integrated with the processor or MCU 404, or comprise a stand-alone hardware device or software process (or combinations thereof). The connector 401 of the accessory device 400 further includes an ACC-DET pin (used to pull ACC_DET on various devices low), and a media device power supply is also provided.

Also, while not shown, other configurations of the accessory 400 may be used consistent with the invention. For example, in one variant, the accessory 400 is a dongle having one or more USB connectors disposed thereon (e.g., on the other end or opposing side of the dongle housing).

Figure 2:
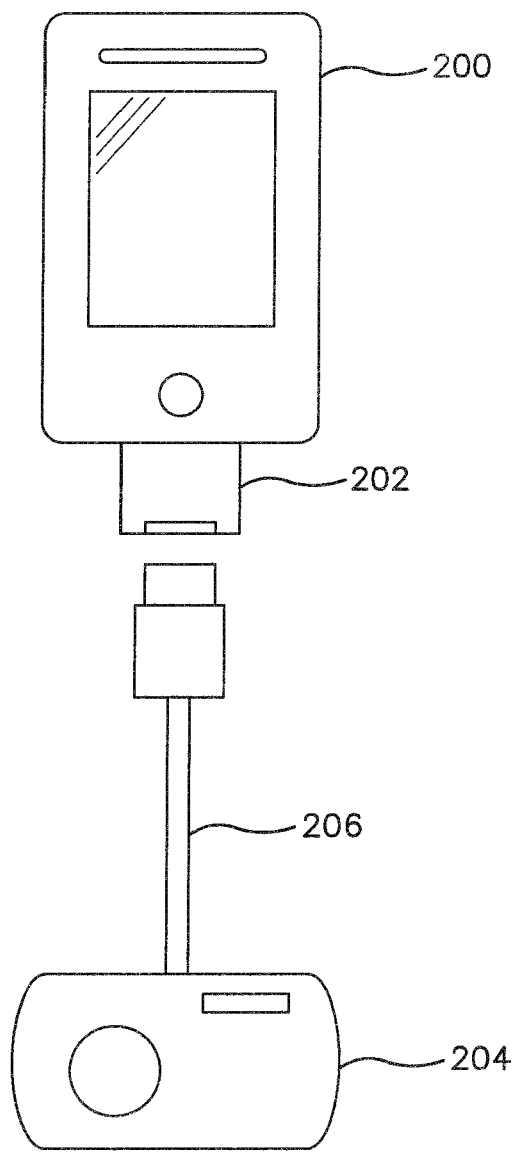
FIG. 2 is top elevation view illustrating a typical prior art interface between a USB-enabled peripheral (e.g., USB camera) and a media capable user device via an interposed receptacle device.

The MCU 404 of the accessory of FIG. 4 advantageously communicates with the user device 300 (FIG. 3) via the USB interface data pins (D+, D−), as opposed to using "side" or ancillary communication pins such as the serial audio in/out pins previously described with respect to the prior art device of FIG. 2. Similarly, video-related communications can be conducted between the MCU and processes on the user device 300 via the USB data pins (e.g., according to a prescribed higher layer protocol) as opposed to requiring separate video interfaces. In this fashion, the 30-pin connector of the accessory device 400 of FIG. 4 actually requires significantly less I/O (pins and supporting hardware/firmware) than the prior art 30-pin connector/dongle of FIG. 2, since the USB pins are doing "double" or more duty.

USB Accessory Device Detection Scenarios

The following example scenarios briefly illustrate various aspects of the improvements of the methods and apparatus of the invention, specifically with regard to the enhanced and consolidated device detection and identification capabilities (and host/peripheral negotiation capability) provided thereby. While described in the context of an exemplary user device having particular pins, it will be appreciated that these scenarios are in no way limiting to the scope of the invention, and are purely for purposes of illustration.

1. In one example scenario, a user device is connected to a legacy accessory device (i.e., a device which is controlled via a serial bus) via a proprietary connector. The ACC_DET (accessory detect pin of the external connector on the user device) is pulled low. The ACC_ID (accessory ID pin of the user device) is pulled low (the voltage corresponding to a particular type of device). The user device thus determines that it is connected to a legacy device. The user device initiates extant authentication and initialization procedures. The legacy accessory device is unaware of any difference in user device operation.

2. In another scenario, an user device is connected to a USB 2.0 compliant accessory device, whether via a common connector (i.e., both the user device and the USB device having a common connector (e.g., multi-pin proprietary connector previously referenced), or via a "dongle" having the proprietary connector on one port and a USB 2.0 connector on a second port. The ACC_DET pin is pulled low. The ACC_ID floats (i.e., it is unconnected). The user device thus determines that it is connected to a USB-based device. The user device initiates USB initialization procedures. If the USB-based device provides a VBUS (USB power), then the user device implements logic to determine whether to operate as a USB "peripheral" device or simply use the accessory as a power supply, depending on the values on the D⁺ and D⁻ if pins (FIG. 1) of the USB interface.

If the accessory device does not provide VBUS, then the user device becomes the USB "host" device. During host mode operation, the user device provides a reduced VBUS (e.g. 3.3V, less than 200 mA current), and determines the appropriate speed (High Speed (HS), or Low Speed) from the resultant voltages on the D⁺ and D⁻ pins. The USB-compliant accessory device operates as a USB peripheral to the user device.

3. In yet another accessory scenario, an user device is connected to a legacy power "brick", whether via a common connector (i.e., both the user device and the USB device having a common connector, such as the multi-pin proprietary connector previously described), or via a "dongle" having the proprietary connector on one port and a USB 2.0 compliant connector on a second port. The ACC_DET pin is pulled low. An A/D converter on the user device determines that the ACC_ID pin is connected with a resistor to power (e.g., a resistor having a specific resistance value), corresponding to a particular device type (e.g., one having a power "brick"). The user device begins charging from the VBUS (5V) pin.

4. In yet another accessory scenario, an user device is connected to a USB-based power "brick" whether via a common connector (i.e., both the user device and the USB device having a common connector, such as the multi-pin proprietary connector previously described), or via a "dongle" having the proprietary connector on one port and a USB 2.0 compliant connector on a second port. The ACC_DET pin is pulled low. The ACC_ID floats (it is unconnected). The user device thus determines that it is connected to a USB-based device. Upon checking the D⁺ and D⁻ pins (FIG. 1), the user device determines that the device is single ended (e.g., both D+ and D− pins at the same voltage). Accordingly, the user device determines that it is connected to a USB power brick, and begins charging from VBUS (5V).

Methods

Methods of implementing the various aspects of the functionality described previously herein are now described in detail.

In an exemplary embodiment of the present invention, a portable media player, smartphone, or other such user device utilizes its connector interface so as to support a plurality of different USB operational modes between itself and a connected accessory, based on the configuration of the accessory.

Figure 5:
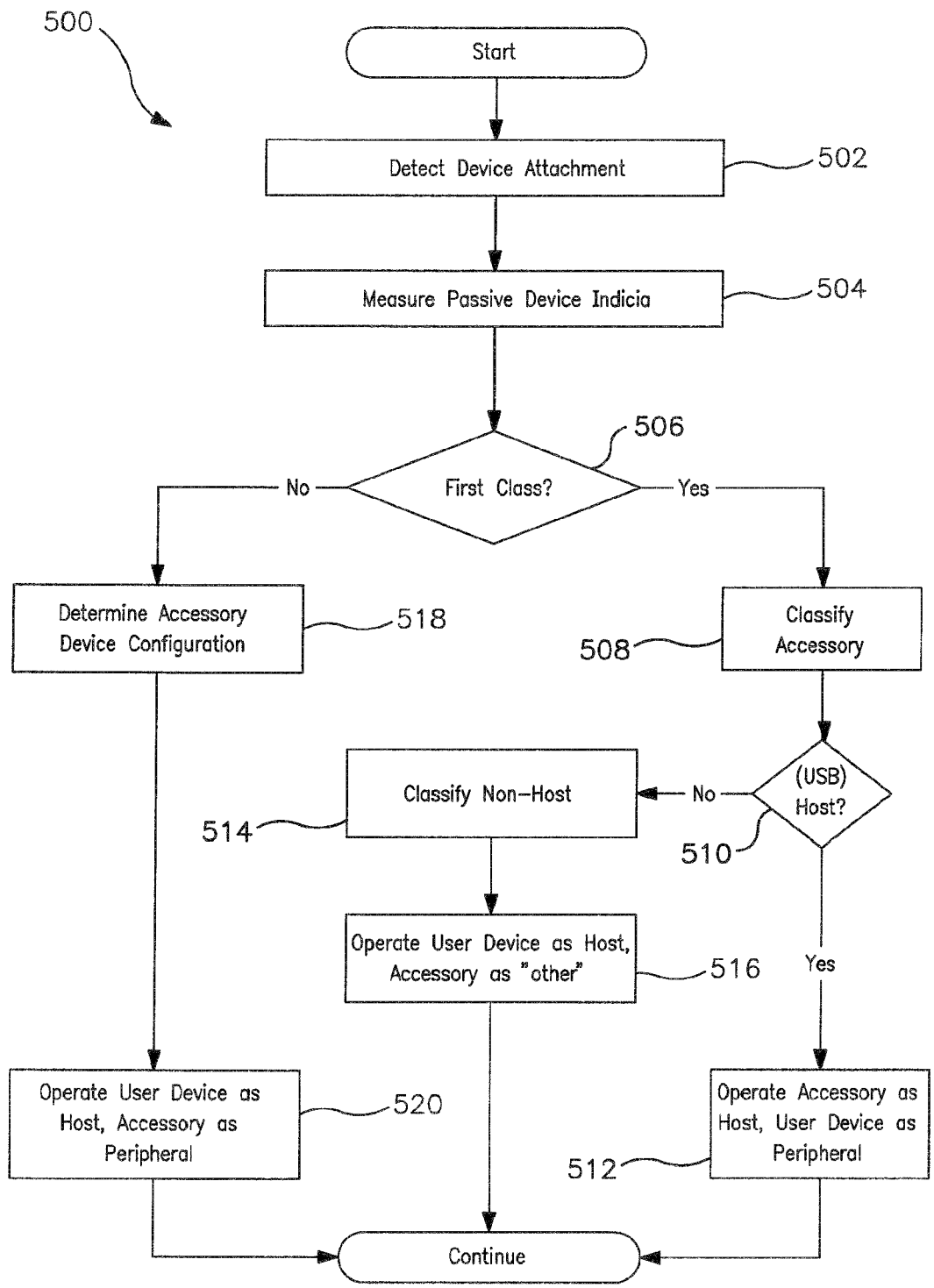
FIG. 5 is a logical flow chart illustrating one embodiment of the generalized method of device detection and negotiation according to the invention.

FIG. 5 is a flow chart representation of one embodiment of the generalized method for such "adaptive" accessory detection and operation. It will be appreciated however that while described primarily in the context of USB host/peripheral device types, the methodology of FIG. 5 may be readily adapted to other scenarios and equipment types. For instance, if additional device types are subsequently added to the model (e.g., a device type that can assume at least some properties of a host and peripheral depending on the operational circumstances or configuration in which it is connected), the logic of FIG. 5 can be modified to accommodate and resolve the identity and/or functions of these additional device types. More broadly, the methodology can be applied to non-USB implementations using a "host/peripheral" or "master/slave" paradigm.

At step 502 of the method 500, a first peripheral device is detected. In one exemplary embodiment, one or more pins are monitored for a change in voltage corresponding to the attachment of a device.

In one variant, the pin may be a dedicated accessory detection pin (ACC_DET).

In alternative embodiments, detection may be triggered, periodically polled, or caused by an interrupt. In yet another alternative embodiment, detection may be initialized within a user interface.

At step 504, one or more "passive" indications of device type are measured or determined from the connected first peripheral device. In one embodiment, one or more pins (e.g., power pins such as VBUS) are measured for meaningful or prescribed voltage levels.

In alternate embodiments, the passive indication may be a received signal transmitted from the connected device and complying with a pre-established format. In yet another embodiment, the passive indication may be received from a higher layer of software.

At step 506, if the one or more passive indications of step 504 indicate that the accessory device is of a first class (e.g., powered), then the method proceeds to step 508 where a classification process is performed (e.g., using USB DP/DN detection described elsewhere herein in detail) in order to classify the accessory device.

At step 510, it is determined (based on the classification of step 508) whether the accessory is a "host" device (e.g., USB host) or not. If a host, then the accessory is operated as a host, and the user device (e.g., media player, smartphone, etc.) operated as a slave (e.g., USB peripheral) per step 512. If not a host, then further classification is conducted per step 514 to classify the device (e.g., as a power brick or other type of device which would provide the passive indicia of step 504), and the user device operated as a host per step 516 (with the accessory operated as the "other" type of device for which it has received classification (i.e., neither a USB host or peripheral).

Alternatively, if per steps 504 and 506 the device is not of the first class (but rather of a second class, such as unpowered devices), then the user device is presumed to be the host, and the accessory a slave (peripheral). The accessory device configuration is then determined per step 518. Once the configuration is determined, the user device is operated as a host and the accessory operated as a slave (e.g., USB peripheral) per step 520.

It will be appreciated that while the foregoing discussion identifies a sequential series of passive and active detection, other combinations and sequences may be chosen, based on implementation-specific considerations or applications.

Example Operation

The following discussion illustrates one or more aspects of the method 500 of FIG. 5, particularly in the context of an exemplary user device.

In the following exemplary embodiment, multi-pin connector) has at least first serial "port" or pins, a second serial (USB) port/pins, and charging connections. In the following described embodiment, an user device adapts its multi-pin connector interface to one of the following modes: i) legacy operation for non-USB enabled devices (via extant serial port procedures), ii) detection and classification of an accessory as a non-USB host/peripheral device (e.g. power "brick", etc.), or iii) USB host/peripheral operation. When a USB capable device is connected, the legacy user device performs authentication via the first serial port ("serial" pins in multi-pin connector). If the legacy user device desires to initiate a USB transfer, the transfer is configured via the first serial port. Once both clients have configured their USB transfer, the USB bus is activated, and the transfer is commenced.

Conversely, a user device enabled according to one embodiment of the present invention supports both legacy operation and USB-based operation. The user device of the present invention retains aspects of the legacy user device; however, it can perform detection of supported USB devices without the first serial port, since communications are carried over the USB data interface instead. Accordingly, the exemplary user device may select at least one of two possible control paths: via the first serial port, or via USB.

Figure 6:
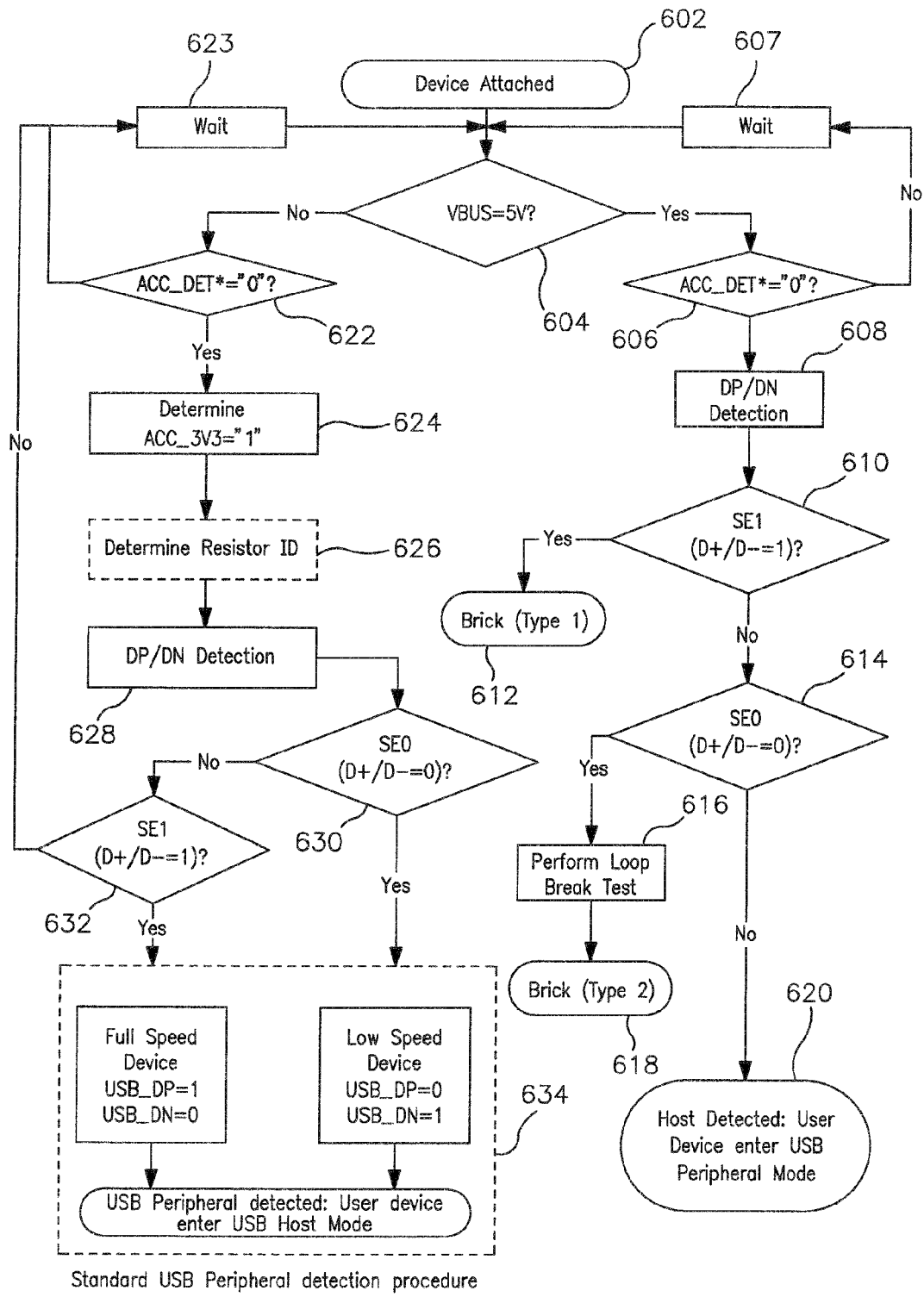
FIG. 6 is a logical flow chart illustrating one exemplary implementation of the generalized method of FIG. 5, in the context of a USB 2.0 capable accessory device and user device.

Referring now to FIG. 6, one implementation-specific flow chart diagram is shown, demonstrating the general principles of the invention. It will be appreciated however that while described primarily in the context of USB host/peripheral device types and various types of electrical power supply devices (aka "bricks"), the methodology of FIG. 6 is in no way limited to such devices, and may be readily adapted to other scenarios and equipment types as previously noted.

The user device determines that the device is a legacy device, or a USB-based device. For a legacy device, the user device implements all of its control and authentication via extant serial protocols. For a USB-based device, the user device implements all of its control and authentication via USB protocols.

At step 602, an unknown device is connected to the user device via the connector (e.g., multi-pin or other connector and/or dongle configuration).

At step 604, the user device determines if VBUS is being supplied by the connected device. If the connected device provides VBUS, then the device is either a power-supplying device (e.g., power brick) or a USB host device (see step 606, et seq.). Otherwise, if the connected device does not provide VBUS, then the attached device is presumed to be a USB peripheral, requiring the user device to assume host mode (see step 622, et seq.).

At step 606, the user device determines whether an accessory detect (ACC_DET) signal is pulled low, thereby (electrically) indicating connection of the accessory device to the user device. If ACC_DET is pulled low, then the accessory is present and the method proceeds to step 608. If not, then the user device enters a wait state (step 607), and waits for the ACC_DET signal to be pulled low (e.g., the user device logic may have checked the ACC_DET signal pin more quickly than the accessory could react). ACC_DET may also be tied to an interrupt of the user device.

At step 608, the user device performs $D^+/D^+$ device detection, to determine if the device is a power brick or a USB host. In this example, power "bricks" (or devices with power bricks) generate either a single ended one (SE1) at step 610, or a single ended zero (SE0) at step 614. For example, a given power brick ("Type 1") might generate a single ended one (SE1) at step 610, i.e. both $D^+$ and $D^-$ are at logic level high (1). This device is then designated as a "Type 1" brick per step 612, and the user device is operated accordingly. A device with another type of "brick" ("Type 2"—e.g., one manufactured according to People's Republic of China regulations and standards, which require that the D+/D− pins be shorted in order to provide loop-back testing functionality), may alternatively provide a single ended zero (SE0) per step 614; i.e., both $D^+$ and D_if are at logic level low (0) at step 610, thereby causing the brick to be designated as "Type 2" per step 618 after the loop break testing has been performed per step 616. Otherwise, if the $D^+$ and $D^-$ are proper differential values per the evaluations of steps 610 and 614, the attached device does not contain a "Type 2" brick, and the user attached device may operate as a USB host device (i.e., the user device operates as a USB peripheral) per step 620.

Alternatively, at step 604 (where the user device monitors the attachment or insertion of a multi-pin device), a lack of VBUS voltage produces a different result. The user device has a weak pull-up resistor attached to the accessory detect (ACC_DET) pin. When a device is attached to the connector at step 604 and there is no VBUS voltage=5V, the pull-up resistor is grounded (driving ACC_DET low) per step 622 If ACC_DET is not pulled low, a wait state (step 623) is entered analogous to that previously described for step 607. Again, ACC_DET may also be tied to an interrupt of the user device.

At step 624, the user device determines that the accessory device supports 3.3V operation as required. If so, then the VBUS of the user device is powered at 3.3V to supply power to the accessory (which is an unpowered USB peripheral).

Next, per step 626, the identification of one or more resistors is optionally determined, as previously described herein. For instance, such specific resistor values can be used to affirmatively identify particular classes or manufacturers of devices (or even particular devices).

At step 628, DP/DN detection is performed by the user device, the values of D+/D− determined analogous to that of steps 610 and 614 previously described. At step 630, if an SE0 condition exists, then standard USB 2.0 detection protocols performed for LS/FS operation of the peripheral (accessory) are performed per step 634, wherein the user device enters USB host mode, and the accessory operates as a USB peripheral.

If at step 630 an SE0 condition does not exist, then step 632 is performed to determine if an SE1 condition exists. If so, the USB 2.0 detection protocols performed for LS/FS operation of the peripheral (accessory) of step 634 are performed. If not, the wait state 623 is entered, so that the ambiguity can be resolved (i.e., the connected accessory has neither an SE0 or SE1 condition, and no VBUS signal and hence is not acting like any of a Host, LS/FS peripheral, or power brick). For instance, the VBUS signal may have been temporarily suppressed, or another process may not have timed out properly, thereby causing the anomalous logic state. Alternatively, another embodiment of the method (not shown) causes the process at step 632 to route to an ambiguity resolution protocol, which may make use of other indicia or signals to better determine the identity of the connected accessory.

In yet another variant, the resistor ID approach of step 626 may be made optional on the first "pass", and then invoked only if the aforementioned ambiguity arises.

Yet other approaches will be recognized by those of ordinary skill given the present disclosure.

FIG. 7 illustrates a truth table corresponding with the flow chart diagram of FIG. 6. It is noted that the table of FIG. 7 further includes logic regarding the ACC_ID pin (i.e., device identification such as via a resistance value as previously described with respect to step 626), although this logic is optional and need not be performed unless specific device identification is required (or alternatively as a "back up" in cases where the above-described detection and negotiation processes fail or are inconclusive).

Moreover, other device identification methods can be used in place of the resistance-based techniques referenced in FIG. 7.

USB 3.0 Variants

In another embodiment of the invention, the high-speed serialized bus interface described above comprises a USB 3.0-compliant interface. The standard for USB 3.0 retains compatibility with USB 2.0 by requiring both a USB 2.0 hub, and a so-called "Superspeed" USB hub. Among other features, the Superspeed USB hub notably adds explicit packet routing, and improvements for burst and bulk data transfers.

Features of the USB 3.0 standard include: (i) the SuperSpeed bus, which increases the maximum transfer rate to 5.0 Gbit/s; (ii) USB 3.0 receptacles compatible with USB 2.0 device plugs for the respective physical form factors. Note however that only USB 3.0 Standard-B receptacles can accept USB 3.0 Standard-B device plugs; (iii) Dual-simplex, over four additional wires, differential signaling separate from USB 2.0 signaling (thus six wires total) to achieve the full Superspeed 5.0 Gbit/s; (iv) support for full-duplex data transfers. (v) data transaction based on asynchronous traffic flow with explicitly routed packet traffic, instead of the polled broadcast packet traffic in USB 2.0; (vi) a "streams" mode for bulk transfer mode, support for continuous burst transfers; (vii) new power management features include support of idle, sleep and suspend states, as well as link and function-level power management; (viii) maximum bus power increased to 150 mA per unit load (+50% over USB 2.0). (ix) minimum device operating voltage is dropped from 4.4V to 4V; (x) no definition of cable assembly lengths, except that it can be of any length as long as it meets all the requirements defined in the specification; (xi) use of 8B1 OB encoding, linear feedback shift register (LFSR) scrambling for data, and spread spectrum, along with low frequency periodic signaling (LFPS), dynamic equalization, and training sequences to ensure fast signal locking In one embodiment, the USB 3.0 interface comprises additional pins not found on the USB 2.0 interface, thereby increasing connector form factor somewhat over what is achievable using the USB 2.0 interface in conjunction with the "pin re-use" techniques of the present invention. Hence, while the USB 3.0 interface of this embodiment is larger in size/pin count, it is also more capable in terms of data rate, full duplex capability, block transfers, etc. The techniques described previously herein for USB 2.0 (i.e., using the USB interface in place of extant serial, video, etc. interfaces) can also be readily applied to comparable pins in the USB 3.0 interface, thereby making the USB 3.0 implementation analogous to that for USB 2.0 in terms of D+/D−, voltages, etc.

As previously noted, such enhanced capabilities of the USB 3.0 interface can be leveraged for example in the delivery of high-bandwidth video (e.g., HD video), or for high-speed accesses to a mass storage device of a user device (e.g., HDD of a laptop or media device) via a connected peripheral. In the latter case, the interface provides storage device access times comparable to that for traditional internal device bus architectures (e.g., PCI, AMBA, etc.), and hence a user device with a mass storage device can act as a connected or proxy storage device for a USB 3.0 capable device connected thereto. Hence, in one such implementation, a user device with mass storage (such as for example an iPod) can act as a directly accessible storage device for a USB "peripheral" via the 3.0 interface.

In another embodiment, a portable user device (e.g., personal media, PDA or telephony apparatus) having a reduced form factor (due to reduced connector size requirements) is used as a differentiating factor in product promotion and sales. To a point, smaller is generally better, and hence the ability to replace the more bulky prior art connector with a smaller connector having the same functionality is desirable and will cause at least some prospective purchasers to buy the product over competitors.

In another embodiment, the ability of the portable user device to perform functions such as digital audio streaming, HD video streaming, etc. (enabled by inter alia the operation of the device as a USB host, and streaming of the audio/video over the digital USB port) is a differentiating factor in sales or promotion.

The foregoing factors (size and/of functionality) may also be used as a price differentiator; such as where the smaller and/or more capable devices of the same family are sold at a higher price.

It will be recognized that while certain aspects of the invention are described in teens of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a peripheral interface of a media-capable device, the method comprising:
    connecting a first device to a connector of the peripheral interface;
    detecting a power signal on a power conductor of the connector, the power conductor being associated with a Universal Serial Bus (USB) data interface;
    based on the detection of the presence of the power signal, entering, by the peripheral interface, a peripheral mode, and
    receiving charging power on the power conductor from the first connected device;
    connecting a second device to a connector of the peripheral interface;
    detecting an absence of a power signal on the power conductor of the connector; and
    based on detecting the absence of the power signal, entering, by the peripheral interface, a host mode, and providing charging power on the power conductor to the second connected device, the method further comprising:
    when the first device is connected and after detecting the power signal, determining values of first and second signals on respective first and second conductors of the connector, the first and second conductors being associated with the USB data interface; and
    based on the determined values of the first and second signals, classifying the first connected device by ascertaining whether the first connected device is a power supply device and ascertaining whether the first connected device is a USB host device,
    wherein the determining the values of signals on the first and second conductors associated with the USB data interface comprises evaluating both a Single Ended 0 (SE0) condition and a Single Ended 1 (SE1) condition on a pair of differential (D+/D−) conductors of the USB interface, and
    wherein classifying the first connected device by ascertaining whether the first connected device is a power supply device and ascertaining whether the first connected device is a USB host device further comprises classifying the first connected device as a Type 1 power supply device when the SE1 condition is detected, classifying the first connected device as a Type 2 power supply device when the SE0 condition is detected, and classifying the first connected device as a USB host device when neither the SE0 nor the SE1 conditions are detected.

2. The method of claim 1, wherein the connector comprises a multi-pin connector comprising serial, video, and a serialized bus protocol conductors in addition to the power conductor and the first and second conductors.

3. The method of claim 1, wherein the connector comprises a 30-pin connector.

4. A portable user device comprising:
    a processor;
    a storage device in data communication with the processor configured for storage of media data; and
    a signal interface in data communication with the processor, the signal interface comprising:
    a connector having a plurality of conductors including a power conductor and first and second data conductors;
    a Universal Serial Bus (USB) interface in signal communication with the connector;
    first logic in communication with at least portions of the plurality of conductors in the connector to:
        after a first device is connected to the connector, detect a power signal on the power conductor;
        based on detecting the power signal on the power conductor, configure the USB interface in a peripheral mode, and receive charging power on the power conductor from the first connected device;
        after a second device is connected to the connector, detect an absence of a power signal on the power conductor;
        configure the USB interface in a host mode, and provide charging power on the power conductor to the second connected device,
    wherein the first logic further:
    when the first device is connected to the connector and after the power signal is detected, determines a voltage on each of the first and second data conductors of the connector; and based on the determined voltages on the first and second conductors, determines whether the first connected device is a power supply accessory and determines whether the first connected device is a host device,
    wherein the determination of the values of the first and second signals comprises an evaluation of both Single Ended 0 (SE0) and Single Ended 1 (SE1) conditions on a pair of differential conductors (D+/D−) of the USB interface, and
    wherein determining whether the first connected device is a power supply accessory and determining whether the first connected device is a host device further comprises classifying the first connected device as a Type 1 power supply device when the SE1 condition is detected, classifying the first connected device as a Type 2 power supply device when the SE0 condition is detected, and classifying the first connected device as a USB host device when neither the SE0 nor the SE1 conditions are detected.

5. The portable user device of claim 4, wherein:
    the signal interface is configured to operate according to a host mode;
    the USB interface comprises a Universal Serial Bus 2.0 interface; and
    the host mode comprises USB 2.0 Host Mode.

6. The portable user device of claim 5, wherein the signal interface is further configured to operate according to the host mode based at least in part on voltages present on respective ones of USB data pins associated with the USB 2.0 interface.

7. The portable user device of claim 4, wherein the portable user device further comprises a second serialized protocol.

8. The portable user device of claim 7, wherein the second serialized protocol comprises a FireWire (IEEE Std. 1394) protocol.

9. The portable user device of claim 8, wherein the connector comprises a 30-pin connector.

10. A portable user device comprising:
    a processor;
    a storage device in data communication with the processor; and
    a signal interface in data communication with the processor, the signal interface comprising:

a connector to connect the portable user device to a second and a third device, the connector having a power conductor, a first signal conductor, and a second signal conductor;

a serialized protocol interface in signal communication with the connector; and logic in communication with the connector and operative to, after connection to the second device:
  determine that a power signal is absent on the power conductor of the connector;
  configure the serialized protocol interface in a host mode, and provide charging power on the power conductor to the second device;

after connection to the third device:
  determine that a power signal is present; and
  based on the presence of the power signal, configure the serialized protocol interface in a peripheral mode, receive charging power on the power conductor from the third device, wherein the logic further:
  when the third device is connected to the connector and after the power signal is detected, determines a voltage on each of the first and second data conductors of the connector; and based on the determined voltages on the first and second data conductors, determines whether the third connected device is a power supply accessory and determines whether the third connected device is a host device,
  wherein the determination of the voltages on the first and second data conductors comprises an evaluation of both Single Ended 0 (SE0) and Single Ended 1 (SE1) conditions on a pair of differential conductors (D+/D−) of a USB interface,
  wherein determining whether the third connected device is a power supply accessory and determining whether the third connected device is a host device further comprises classifying the third connected device as a Type 1 power supply device when the SE1 condition is detected, classifying the third connected device as a Type 2 power supply device when the SE0 condition is detected, and classifying the third connected device as a USB host device when neither the SE0 nor the SE1 conditions are detected.

11. The portable user device of claim 10, wherein the portable user device comprises a media-capable device.

12. The portable user device of claim 11, wherein the serialized protocol interface comprises a Universal Serial Bus (USB) 2.0 interface, and the host mode comprises USB 2.0 Host Mode.

13. The portable user device of claim 10, wherein the portable user device comprises a media-capable device, and the serialized protocol comprises a Universal Serial bus (USB) protocol.

14. The portable user device of claim 13, wherein the portable user device further comprises a second serialized protocol.

15. The portable user device of claim 14, wherein the second serialized protocol comprises a FireWire (IEEE Std. 1394) protocol.

* * * * *